Patented Apr. 28, 1942

2,280,837

UNITED STATES PATENT OFFICE 2,280,837

ERYTHRINA ALKALOID AND ITS PRODUCTION

Randolph T. Major and Karl Folkers, Plainfield, N. J., assignors to Merck & Co., Inc., Rahway, N. J., a corporation of New Jersey No Drawing. Continuation of application Serial No. 154,755, July 21, 1937. This application January 20, 1940, Serial No. 314,865

16 Claims. (Cl. 260—236)

This invention relates to a new substance suitable for use as a substitute for the drug curare, and to processes for its production.

The new substance, tetrahydroerythroidine, either as the free base or in the form of a salt such as the hydrochloride, hydrobromide, hydriodide, etc., has been found to exhibit strong paralyzing effects upon the motor system, and may be used as a substitute for the difficultly obtainable and relatively expensive curare, itself. Also, it has other advantages over curare in that it is a pure substance which may be administered in accurate doses of known uniform potency, whereas curare is a heterogeneous mixture of varying composition and potency.

In general, according to our process, the new substance may be produced in the form of a salt, from which the free base may be readily obtained.

For example, pure erythroidine hydrochloride in a suitable solvent may be hydrogenated over a catalyst suitable for the hydrogenation of carbon-carbon double bonds, such as for example, platinum, palladium, nickel, etc., until the required amount of hydrogen is taken up. The solution is then filtered and concentrated to a thick gum and absolute ether is added until tetrahydroerythroidine hydrochloride hemihydrate crystallizes out. The anhydrous salt may be obtained by drying.

From the hydrochloride, the free base may be obtained by alkalinizing an aqueous solution of the salt, exhaustively extracting with an organic solvent such as chloroform, distilling, and finishing up in the usual manner. It occurs in the form of a thick oil which distills at 75–100° and $10^{-4}$ to $10^{-5}$ mm. pressure.

The detailed steps of the process are set forth in the following example. It will be obvious that the steps of the process may be modified in various details, as for instance, with respect to the salt of erythroidine employed as starting material, and the solvent, pressure, temperature and catalyst employed, without departing from the described invention, and the appended claims, and it is understood that we are not to be limited except as may be necessitated by the prior art.

Example

About one-half gram of erythroidine hydrochloride dissolved in about 50 ml. of water is hydrogenated over a platinum catalyst or other carbon-carbon double bond hydrogenation catalyst, at 25°. After about 50 minutes, the proper amount of hydrogen is absorbed. The solution is filtered from the catalyst, and concentrated in vacuo to a thick gum. The gum is dissolved in absolute alcohol, absolute ether is added, and tetrahydroerythroidine hydrochloride hemihydrate crystallizes out. It has a melting point of about 215–17°. The anhydrous salt is obtained by drying the hemihydrate in vacuo at 100°. As disclosed above other tetrahydroerythroidine hydrohalides as, for example, the hydrobromide (melting point about 224–227°; melting point after drying about 215–218°) and hydriodide may be prepared by similar treatment of the appropriate corresponding erythroidine hydrohalide.

An aqueous solution of the salt is made alkaline by treatment with a solution of an alkali metal carbonate, such as sodium bicarbonate, exhaustively extracted with chloroform, and distilled. The free tetrahydroerythroidine base thus obtained occurs as a thick oil which distills at 70–100° and $10^{-4}$ to $10^{-5}$ mm. pressure.

The erythroidine hydrohalides employed as starting materials in the process of the instant application are mixtures of $\alpha$- and $\beta$-erythroidine hydrohalides. Therefore, it is to be understood that the tetrahydroerythroidine and salts disclosed herein are mixtures of tetrahydro isomers. The erythroidine hydrohalides are prepared by treating parts of species of Erythrina to remove inherent fatty oils, extracting with an organic solvent, removing the solvent, and acidifying the residue with an appropriate acid. The solution is concentrated in vacuo until the selectively dissolved alkaloid, hypaphorine, crystallizes out in the form of its salt corresponding to the acid used in the acidulation step. The residual acidified solution remaining after separation of the hypaphorine is alkalinized and then extracted with an immiscible organic solvent to give a "free" alkaloidal fraction which may consist of $\alpha$- and $\beta$-erythroidine, or from which $\alpha$- and $\beta$-erythroidine may be obtained. Erythroidine may be obtained as a base, and later converted to its corresponding hydrohalides, by treating with appropriate agents, as for example, hydrogen chloride, and the like, or it may be obtained directly in the form of a hydrohalide by treating the alkalinized residue from the hypaphorine extraction with an appropriate acid, for example, hydrochloric acid.

Also, erythroidine may be isolated directly from solutions of parts of species of Erythrina by pretreating the latter to remove the fatty oils inherent therein, then alkalinizing the pre-treated materials and extracting the alkalinized solution with a suitable solvent, and the erythroidine thus obtained may be converted to its hydrohalide, as described. The Erythrina alkaloid erythroidine (α- and β-erythroidine) referred to herein has the empirical formula $C_{16}H_{19}NO_3$.

The α- and β-erythroidine mixture occurs in the "free" fraction from certain Erythrina species in preponderant quantities and can be produced therefrom in the form of a hydrohalide or other salt by treatment of the material with the appropriate agent corresponding to the hydrohalide or salt to be obtained. In the "free" fraction from other species of Erythrina, the amount of α- and β-erythroidine present is smaller as compared to the amounts of accompanying alkaloids, in which case the α- and β-erythroidine may be produced in the form of hydrochlorides, to ensure their selective production.

This application is a continuation of our application Serial No. 154,755, filed July 21, 1937.

We claim as our invention:

1. A tetrahydrogenated derivative of the Erythrina alkaloid having the empirical formula $C_{16}H_{19}NO_3$, and which exhibits the physiological action of curare.

2. The tetrahydrogenated form of the Erythrina alkaloid having the empirical formula $C_{16}H_{19}NO_3$, and which exhibits the physiological action of curare.

3. Hydrohalides of the tetrahydrogenated form of the Erythrina alkaloid having the empirical formula $C_{16}H_{19}NO_3$, and which exhibit the physiological action of curare.

4. The hydrochloride of the tetrahydrogenated form of the Erythrina alkaloid having the empirical formula $C_{16}H_{19}NO_3$, and which exhibits the physiological action of curare.

5. The hydrobromide of the tetrahydrogenated form of the Erythrina alkaloid having the empirical formula $C_{16}H_{19}NO_3$, and which exhibits the physiological action of curare.

6. The step in a process for the production of a tetrahydrogenated derivative of the Erythrina alkaloid having the empirical formula $C_{16}H_{19}NO_3$, and which exhibits the physiological action of curare, which comprises hydrogenating a hydrohalide of said alkaloid in aqueous solution over a catalyst suitable for the hydrogenation of carbon-carbon double bonds, until the required amount of hydrogen is absorbed.

7. The process for the production of a tetrahydrogenated derivative of the Erythrina alkaloid having the empirical formula $C_{16}H_{19}NO_3$, and which exhibits the physiological action of curare, which comprises hydrogenating a hydrohalide of said alkaloid in aqueous solution over a catalyst suitable for the hydrogenation of carbon-carbon double bonds until the required amount of hydrogen is absorbed, filtering the solution, concentrating, dissolving in alcohol, adding ether to precipitate the salt, alkalinizing an aqueous solution of the salt, extracting with an organic solvent, and recovering the tetrahydrogenated base.

8. The process for the production of a tetrahydrogenated derivative of the Erythrina alkaloid having the empirical formula $C_{16}H_{19}NO_3$, and which exhibits the physiological action of curare, which comprises hydrogenating the hydrochloride of said alkaloid in aqueous solution over a catalyst suitable for the hydrogenation of carbon-carbon double bonds until the required amount of hydrogen is absorbed, filtering the solution, concentrating, dissolving in alcohol, adding ether to precipitate the salt, alkalinizing an aqueous solution of the salt, extracting with an organic solvent, and recovering the tetrahydrogenated base.

9. The process for the production of a tetrahydrogenated derivative of the Erythrina alkaloid having the empirical formula $C_{16}H_{19}NO_3$, and which exhibits the physiological action of curare, which comprises hydrogenating the hydrobromide of said alkaloid in aqueous solution over a catalyst suitable for the hydrogenation of carbon-carbon double bonds until the required amount of hydrogen is absorbed, filtering the solution, concentrating, dissolving in alcohol, adding ether to precipitate the salt, alkalinizing an aqueous solution of the salt, extracting with an organic solvent, and recovering the tetrahydrogenated base.

10. The process for the production of a tetrahydrogenated derivative of the Erythrina alkaloid having the empirical formula $C_{16}H_{19}NO_3$, and which exhibits the physiological action of curare, which comprises hydrogenating a hydrohalide of said alkaloid in aqueous solution over a catalyst suitable for the hydrogenation of carbon-carbon double bonds until the required amount of hydrogen is absorbed, filtering, concentrating, dissolving in alcohol, and adding ether to crystallize out the tetrahydrogenated alkaloid hydrohalide.

11. The process for the production of a tetrahydrogenated derivative of the Erythrina alkaloid having the empirical formula $C_{16}H_{19}NO_3$, and which exhibits the physiological action of curare, which comprises hydrogenating the hydrochloride of said alkaloid in aqueous solution over a catalyst suitable for the hydrogenation of carbon-carbon double bonds until the required amount of hydrogen is absorbed, filtering, concentrating, dissolving in alcohol and adding ether to crystallize out the hydrochloride of the tetrahydrogenated base.

12. The process for the production of a tetrahydrogenated derivative of the Erythrina alkaloid having the empirical formula $C_{16}H_{19}NO_3$, and which exhibits the physiological action of curare, which comprises hydrogenating a hydrobromide of said alkaloid in aqueous solution over a catalyst suitable for the hydrogenation of carbon-carbon double bonds until the required amount of hydrogen is absorbed, filtering, concentrating, dissolving in alcohol and adding ether to crystallize out the hydrobromide of the tetrahydrogenated base.

13. In a process for the production of a tetrahydrogenated derivative of the Erythrina alkaloid having the empirical formula $C_{16}H_{19}NO_3$, and which exhibits the physiological action of curare, the step comprising hydrogenating a hydrohalide of said alkaloid in aqueous solution over platinum.

14. In a process for the production of a tetrahydrogenated derivative of the Erythrina alkaloid having the empirical formula $C_{16}H_{19}NO_3$, and which exhibits the physiological action of curare, the step comprising hydrogenating a hydrohalide of said alkaloid in aqueous solution over palladium.

15. In a process for the production of a tetrahydrogenated derivative of the Erythrina alkaloid having the empirical formula $C_{16}H_{19}NO_3$, and which exhibits the physiological action of curare, the step comprising hydrogenating a hydrohalide of said alkaloid in aqueous solution over nickel.

16. The process for the production of a tetrahydrogenated derivative of the Erythrina alkaloid having the empirical formula $C_{16}H_{19}NO_3$, and which exhibits the physiological action of curare, which comprises hydrogenating a hydrohalide of said alkaloid in aqueous solution over platinum until the required amount of hydrogen is absorbed, filtering the solution, concentrating, dissolving in alcohol, adding ether to precipitate the salt, alkalinizing an aqueous solution of the salt, extracting with an organic solvent, and recovering the tetrahydrogenated base.

RANDOLPH T. MAJOR.
KARL FOLKERS.